Nov. 24, 1959   J. M. BRIDGMAN ET AL   2,913,975
FILM PROCESSOR
Filed Oct. 17, 1956   3 Sheets-Sheet 1

INVENTORS
JOSEPH MONTAGUE BRIDGMAN
ERNST GUENTHER SCHMIDT

Nov. 24, 1959　　J. M. BRIDGMAN ET AL　　2,913,975
FILM PROCESSOR
Filed Oct. 17, 1956　　　　　　　　　　　　　　3 Sheets-Sheet 2

INVENTORS
JOSEPH MONTAGUE BRIDGMAN
ERNST GUENTHER SCHMIDT

Nov. 24, 1959  J. M. BRIDGMAN ET AL  2,913,975
FILM PROCESSOR
Filed Oct. 17, 1956  3 Sheets-Sheet 3

INVENTORS
JOSEPH MONTAGUE BRIDGMAN
ERNST GUENTHER SCHMIDT
BY
ATTORNEYS

United States Patent Office 2,913,975
Patented Nov. 24, 1959

2,913,975

FILM PROCESSOR

Joseph M. Bridgman and Ernst G. Schmidt, both of Scarboro, Ontario, Canada, assignors to PSC Applied Research Limited, Toronto, Ontario, Canada Application October 17, 1956, Serial No. 616,509

7 Claims. (Cl. 95—94)

Our invention relates to film processing and this application is a continuation-in-part of Serial No. 483,589, filed January 24, 1955, now abandoned.

As is well-known in the art, to process exposed film it is necessary to pass the film successively through baths of developer, fix and wash water, ensuring that each of these baths comes in contact with the exposed film for a predetermined length of time.

While the bath method (i.e. the dipping of the film into successive solutions) is used for relatively short films, the continuous processing method has been most in favour for longer lengths of film, and particularly for movie films. According to this latter method a plurality of baths are provided in adjacent tanks and the film threaded between rollers, idlers and associate tension devices into and through each of these baths to a take-up spool at the end thereof. When the film has been so threaded, a mechanism is set in operation and the film passed continuously through the successive baths at a predetermined rate of speed, which rate will determine the length of time the film remains in contact with each successive bath.

One great disadvantage in this method has been the necessity of providing a long leader—often as much as 20 or 25 feet—to thread through the take-up mechanism and associate processing tanks. This, of course, would be wasted film since the leader so threaded would not receive proper processing. Thus, it has been the practice to splice a length of leader to the film to be processed. This, however, has often been inconvenient and a time-consuming process.

Another disadvantage which could arise in this prior practice is the fact that different film manufacturers provide film with different notches or cut-out portions adapted to fit their respective cameras. In the prior processing devices it could happen that modifications to the sprockets would be required to engage such different films.

It is a principal object of our invention, therefore, to provide a continuous film processor whereby the necessity for a long leader and pre-threading through the system will be unnecessary.

It is another object of our invention to provide a film processor capable of processing different widths and types of films regardless of the configurations of their notches and cut-out portions.

It is another object of our invention to provide such a processor having a minimum of working parts for the transport of the film through the processor.

These and other advantageous objects will become apparent through a consideration of the following detailed description taken in conjunction with the attached drawings in which.

Figures 1, 5:
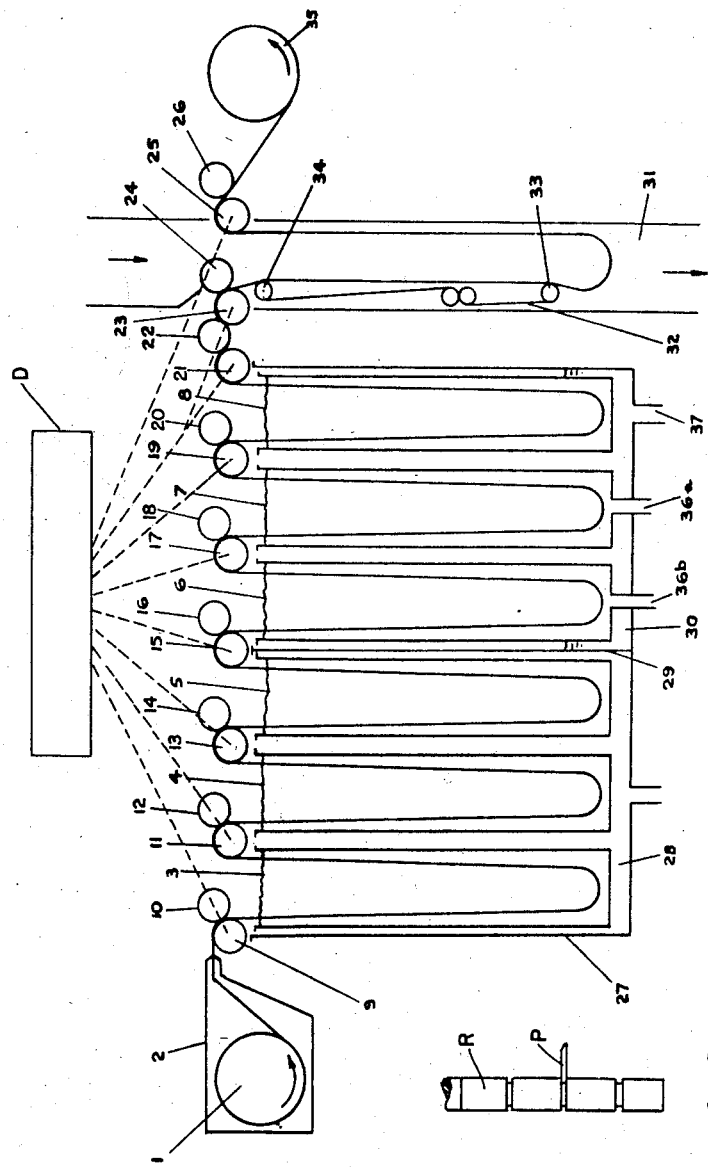
Figure 1 is a schematic view illustrating the operation of our improved film processor.
Figure 5 is a plan view of one of the rollers showing a portion of a dividing plate associated therewith.

In the drawings, an exposed film on a spool 1 is loaded into a magazine 2 and fitted into a holder provided at one end of the processor. The processing apparatus comprises a plurality of tanks shown as 3, 4, 5, 6, 7 and 8 located adjacent to each other in a straight line.

A rotatable roller, such as 9, 11, 13, etc. is mounted horizontally just above and to the left of each tank, as shown in the drawings, the intermediate rollers (such as 11, 13, etc.) thus being approximately midway between the adjacent tanks (in this case 3, 4 and 5) and all rollers being in the same horizontal plane. The rollers are of sufficient diameter that a vertical tangent to either side thereof will fall into the tank above which the roller is suspended, each roller thus in effect overlapping two tanks. These rollers may be of any material desired, such as rubber or stainless steel but, in choosing the material, regard should be had to the necessity for providing substantial friction between roller and film, as will be outlined hereinafter, and to corrosion by the chemicals used in the various baths.

In the drawings we have shown six successive tanks (3 through 8 in the drawings), and thus six rollers will be required (9, 11, 13, 15, 17 and 19) plus an additional roller 21 at the end of the final tank.

The tanks are mounted in an outer shell 27 and heated water is circulated around the outside of tanks 3, 4 and 5, through the space 28 formed between shell 27 and the tanks 3, 4 and 5. A central partition 29 divides this hot water jacket from the space 30 between shell 27 and the tanks 6, 7 and 8 through which space 30 cool fresh water is caused to circulate in a manner which will be outlined in detail hereinafter. Developer solution may be placed in tank 3, fixing solution in tanks 4 and 5, water in tanks 6 and 7 and alcohol in tank 8 in order to provide quick and efficient processing of the film according to the manner of this invention.

It is well-known in the art that rinse water for film developing must be kept fresh, and, to that end, we use a water circulating system as is best illustrated in Figure 1. Fresh water is added continuously through inlets 36a and 36b in the bottom of tanks 6 and 7 respectively. The overflow from these tanks passes over the top of tanks 6 and 7 and into the space 30 surrounding tanks 6, 7 and 8, passing out through outlet 37 in space 30 located at the bottom thereof. Thus the water in rinse tanks 6 and 7 is kept fresh.

The developer and fix may be replenished by drawing spent solution from tanks 3, 4 or 5 and adding fresh solution as required, the hot water jacket surrounding these tanks ensuring that the developer solution and fix solution are maintained at the most efficient operating temperature.

Following tank 8 are one or more further rollers 21 and 23 also mounted in the same plane as the rollers already mentioned and following these rollers a chamber 31 is provided with yet another roller 25 above and to the right thereof. An endless conveyor belt 32 is provided towards the left of this chamber 31 and extends over pulleys 33 and 34 from substantially the top to the bottom of chamber 31. A driven film take-up spool 35 is provided at the end of the processor.

The parts thus far described comprising the magazine, receptacle, tanks, water jackets, chamber 31 and associated rollers, form the bottom portion of the processor cabinet. A top portion indicated generally as 36 is connected to this bottom portion as by hinge pin 37. This top or cover portion, which is shown as raised in Figure 2, carries a number of idler rollers each of which being adapted, when the cover is lowered, to frictionally engage one roller in the bottom portion. Thus roller 10 engages roller 9, roller 12 engages roller 11 and so on. The upper rollers 10, 12, 14, 16, etc. are attached in the cover by arms as 38 and 39 which arms are held in position as by strips of resilient metal 40 and 41. When the cover is swung down, the rollers 10, 12, etc., after making initial contact with their corresponding rollers 9, 11, etc., are swung slightly on arms 38 and 39 and held in relative relationships, as shown in Figure 1, slightly above and to the right of their corresponding lower rollers, but in close contiguity therewith by means of the resilient metal strips 40, 41, etc.

A plurality of fingers 42, 43, etc., are provided, one for each pair of upper rollers which come into contact, the fingers being located slightly above and to the right of the rollers when the latter are in closed position.

The cover 36 is adapted to be firmly secured to the bottom portion as by means of bar 44 and hook 45 and the cabinet and cover are so constructed as to provide a light, tight seal when in the closed position.

Figure 2:
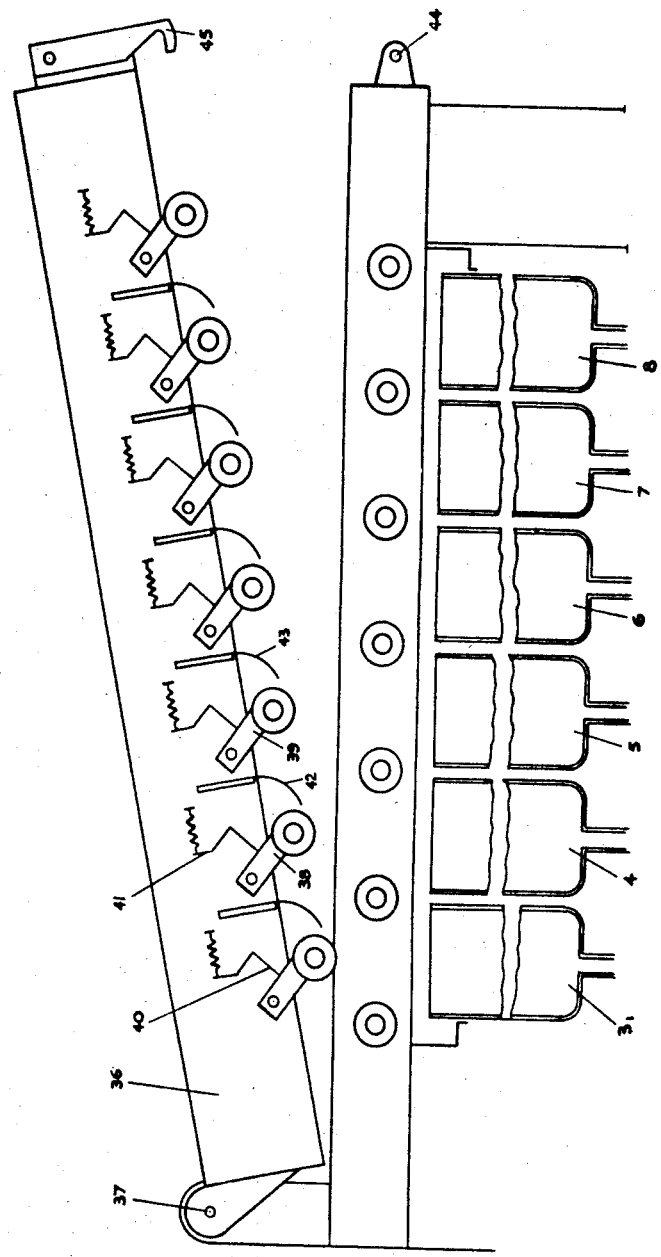
Figure 2 is a shortened side elevation, partly in section, of a processor cabinet constructed according to our invention.

The operation of this processor is as follows:

With the cover portion open, as shown in Figure 2, the magazine containing the exposed film is placed in position and a portion of the exposed film withdrawn. Sufficient film only is withdrawn to reach the take-up spool at the other end of the processor, and to start the films therein, the withdrawn portion being laid over the bottom rollers 9, 11, 13, etc. in substantially a straight line. The cover portion is thereupon swung down and the cabinet locked shut, bringing the upper rollers 10, 12, 14, etc. into contact with their corresponding lower rollers 9, 11, 13, etc. and closely retaining the film therebetween through the action of the springs 40, 41, etc.

As has already been pointed out, this invention is particularly advantageous for processing relatively long films. We have discovered in practice that such films are not usually encountered in widths greater than 70 mm., which film width is extensively used in aerial photography wherein a large number of frames are successively exposed from an aircraft and the resultant prints mounted in mosaic form. In addition, common movie film widths are 35 mm. and 16 mm., and for reasons which will become apparent hereinafter, our invention may be effectively carried out with the provision of rollers slightly greater in width than 70 mm. It is to be understood, however, that the foregoing is offered by way of example only and that in practice any width which may be required or desirable may be used.

If the aforesaid rollers are notched at their quarters, dividing plates may be inserted between the notches as and when required for a given film, and a plurality of films processed simultaneously. Thus if a 70 mm. film is to be processed, no divider would be necessary; if 35 mm. film is to be processed, one divider plate could be inserted at the mid-notch of the rollers, and thus two 35 mm. films processed side by side; and, similarly, if 16 mm. film is required, three divider plates could be used which would permit the simultaneous treatment of four 16 mm. films. Figure 5 illustrates a suitable form for the notched roller, the roller being identified at R with a portion of a dividing plate P associated with the mid-notch of the roller as employed in processing two 35 mm. films side by side.

It will be appreciated that these divider plates must, for effective operation, extend from the rollers down a considerable distance into each processing tank to prevent fouling of adjacent loops in the tank.

According to this invention the lower rollers are provided with a source of rotative motion of predetermined speed and, when the cover has been closed as outlined above, roller 9 is caused to rotate while the other rollers are left immobile. Roller 10 will be given a rotative motion because of its frictional engagement with roller 9 and the film will be urged between these rollers and into tank 3. Since rollers 11 and 12 are not rotating, but are closely engaging the film therebetween, this forcing of the film into tank 3 by rollers 9 and 10 will cause a loop to form in the film in tank 3. The finger 42 will, at this point, prevent the film from sticking to roller 9 and, in pushing the film down off roller 9, will assist the formation of this loop. As roller 9 continues to convey film into the tank, the loop will lengthen and when the loop has acquired the desired length, roller 12 may then be actuated either by hand or automatically and rotation of rollers 9 and 10 at equal velocity will cause the film to pass around the loop now formed in tank 3 and start to form a loop in tank 4 because of the non-rotation of rollers 13, 15, etc. Similarly, when the loop in tank 4 is of the proper size, roller 13 will be rotated together with rollers 9 and 11 and so on until loops are formed in all tanks and all rollers are rotating and passing the film successively through each tank.

As shown on Figure 1 a suitable drive means D may be provided to effect successive starting of the respective rollers to form the film loops in the manner as described in detail hereinabove.

Because varying types of film emulsion have different loop forming characteristics, it may sometimes be necessary to take more positive steps to prevent a loop from forming upwards after leaving a pair of rollers beyond the simple provision of the fingers 42, 43, etc.

Figure 3:
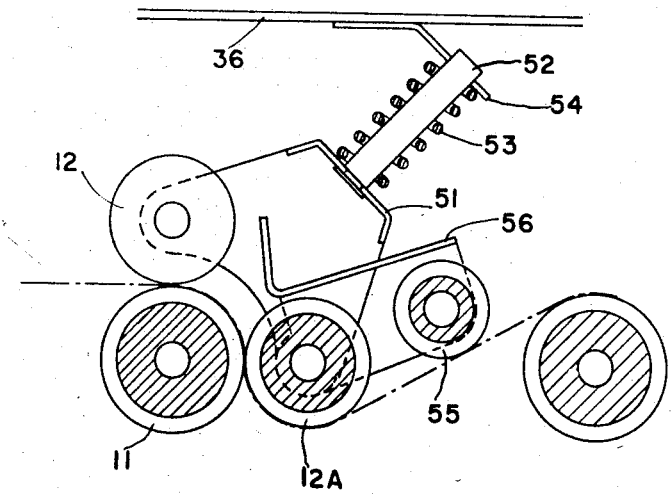
Figure 3 is a detailed side view partly in section showing an alternative form of roller assembly prior to loop formation.
Figure 4:
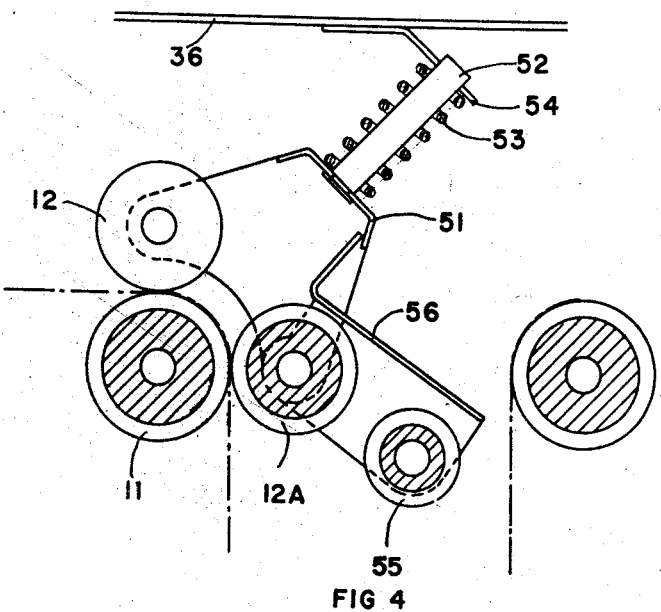
Figure 4 is a view similar to Figure 3 showing the same assembly after loop formation.

An arrangement as illustrated in Figures 3 and 4 will induce the film to form the required downward loop. Referring particularly to these drawings, then, roller 11 is the same lower roller mounted upon the tanks and provided with a source of rotative power as has already been described. In this embodiment, however, two upper rollers 12 and 12A are provided instead of a single upper roller as formerly. These rollers 12 and 12A are mounted in fixed relationship to each other on a bracket 51 which is slideably mounted on pin 52 which in turn is firmly affixed to the light tight cover 36 as by means of a bracket 54. A compression spring 53 acts to urge the bracket 51 and therefore the rollers 12 and 12A downwards from the cover.

The two rollers 12 and 12A are so spaced from each other as to straddle the lower roller 11 after the cover has been swung down. In this closed condition, the spring acts to keep the two rollers 12 and 12A in firm and positive contact with the lower roller.

A further weighted loop-forming roller 55 is also provided, and this roller is mounted on a bracket 56 which bracket is rotatably mounted on the centre line of roller 12A.

For convenience, one roller assembly only has been illustrated, but it will be appreciated that in this embodiment of the invention all lower rollers 9, 11 etc. will be provided with corresponding upper roller assemblies as above described.

In operation, after the film has been laid over the lower rollers, the cover is swung down and the upper rollers assume the positions shown in Figure 3. As will be seen by a reference to Figure 3, the film is then retained between lower roller 11 and upper rollers 12 and 12A in such a manner that a downward loop is formed; roller 12A occupying a position substantially horizontal with lower roller 11. At this stage the weighted loop-forming roller 55 merely rests upon the film as shown.

When roller 11 is rotated, the film loop must form in the downward position for as the film is gradually fed between roller 11 and rollers 12 and 12A (the following roller 13 at this stage being stationary) the weighted loop-forming roller 55 will cause the film to move in a downward direction away from roller 12A. When this roller 55 reaches the limit of its downward motion (see Figure 4) the film loop will be formed in the required downward direction without any tendency for the said loop to climb upwards and the system will operate as shown in Figure 4.

The speed of rotation of the rollers will be such that when a full loop is formed in a tank, the time required for a given portion of the film to pass around the loop will be the proper time required for developing or fixing. Despite the fact that the speed of rotation of all rollers is equal, it is possible to regulate the transit time of passage through each tank by regulating the length of the loop formed in the tank. This may be done by adjusting the time interval between actuation of the roller at the entrance to the tank and actuation of the roller at the exit from the tank.

After the film has passed through the alcohol bath in tank 8, it is led through double rollers 21, 22, 23 and 24 into a drying chamber. An endless conveyor belt passes around pulleys located at the entry side of the drying chamber, the speed of travel of the belt being slightly greater than that of the film. The film emerging from the alcohol bath is extremely tacky, and will adhere readily to any surface presented. The film thus adheres to the downward travelling side of the conveyor belt 32 just as it passes over top pulley 34. Because the conveyor is travelling faster than the film a constant friction force will draw the film down, instead of permitting it to become entangled in rolls in the tank. A constant stream of hot air is directed downwards through the tank and when the film reaches the bottom of the conveyor belt, a loop will be formed and the film will pass upwards through final pulleys 24 and 25 and on to the powered take-up drum 35.

While we have described above several embodiments only of our invention, it is to be understood that such embodiments are offered by way of illustration and not as a limitation. Such embodiments of our invention as come within the scope and purview of the appended claims are to be considered as part of our invention.

What we claim as our invention is:

1. In a film processing device, a plurality of processing fluid containing tanks mounted in a light-tight receptacle, a plurality of lower rollers mounted on said receptacle above said tanks, a light-tight cover for said receptacle, said cover having a plurality of upper rollers mounted therein, said upper rollers being so located that at least one upper roller comes into rotatable frictional contact with each of said lower rollers when said cover is in closed position to provide spaced sets of rollers, said upper and lower rollers being adapted to engage the film to be processed frictionally therebetween, means for successively starting each set of rollers in sequence to rotate together in frictional engagement with the film whereby a plurality of loops is caused to form successively in said film between successive sets of rollers, said means rotating said rollers at the same speed of rotation, said tanks being so located with respect to said rollers that each of said loops of film formed passes into one of said plurality of tanks.

2. A film processing device as claimed in claim 1 having means for preventing said film from adhering to said rollers.

3. A film processing device as claimed in claim 1 wherein said rollers are greater than about 70 mm. in width and are notched at intervals and having divider plates adapted to fit in such notches and extending downward into such tanks.

4. In a film processing device a plurality of processing fluid containing tanks mounted in a light-tight receptacle, a plurality of lower rollers mounted on said receptacle above said tanks, a light-tight cover for said receptacle, a plurality of pairs of upper rollers mounted upon said cover, one such pair of rollers being adapted to straddle each of said lower rollers in frictional rotatable contact when said cover is in closed position to provide spaced sets of rollers, means for successively starting each set of rollers in sequence to rotate together in frictional engagement with the film whereby a plurality of loops is caused to form successively in said film between successive sets of rollers, said means rotating said rollers at the same speed of rotation, said tanks being so located with respect to said rollers that each of said loops of film formed passes into one of said plurality of tanks.

5. In a film processing device a plurality of processing fluid containing tanks mounted in a light-tight receptacle, a plurality of lower rollers mounted on said receptacle above said tanks, a light-tight cover for said receptacle, a plurality of pairs of upper rollers mounted upon said cover, one roller in each such pair being adapted to contact each lower roller in rotatable frictional contact vertically above said lower roller, the other roller in each said pair being adapted to contact each lower roller horizontally in advance of the direction of travel of the film in rotatable frictional contact when said cover is in closed position to provide spaced sets of rollers, said upper and lower rollers being adapted to engage the film to be processed frictionally therebetween, means for successively starting each set of rollers in sequence to rotate together in frictional engagement with the film whereby a plurality of loops is caused to form successively in said film between successive sets of rollers, means rotating said rollers at the same speed of rotation, said tanks being so located with respect to said rollers that each of said loops of film formed passes into one of said plurality of tanks.

6. A film processing device as claimed in claim 4 together with a weighted roller adapted to assist the downward loop formation between successive lower rollers and to preclude upward loop formation therein.

7. A film processing device as claimed in claim 5 together with a weighted roller adapted to assist the downward loop formation between successive lower rollers and to preclude upward loop formation therein.

References Cited in the file of this patent

UNITED STATES PATENTS

| | | |
|---|---|---|
| 2,248,333 | Burbank | July 8, 1941 |
| 2,401,185 | Pratt et al. | May 28, 1946 |
| 2,428,790 | Dye et al. | Oct. 14, 1947 |
| 2,488,141 | Pratt et al. | Nov. 15, 1949 |